United States Patent
Girolamo et al.

(10) Patent No.: US 11,454,208 B2
(45) Date of Patent: Sep. 27, 2022

(54) PULTRUDED FIBROUS COMPOSITE STRIPS HAVING NON-PLANAR PROFILES CROSS-SECTION FOR WIND TURBINE BLADE SPAR CAPS

(71) Applicant: SIEMENS GAMESA RENEWABLE ENERGY A/S, Brande (DK)

(72) Inventors: Donato Girolamo, Molinara (IT); Jens Jørgen Østergaard Kristensen, Nørresundby (DK); Michael Noerlem, Svenstrup (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 13 days.

(21) Appl. No.: 16/219,990

(22) Filed: Dec. 14, 2018

(65) Prior Publication Data

US 2019/0195191 A1    Jun. 27, 2019

(30) Foreign Application Priority Data

Dec. 22, 2017  (EP) ..................................... 17210022

(51) Int. Cl.
*F03D 1/06* (2006.01)
*B29D 99/00* (2010.01)
(Continued)

(52) U.S. Cl.
CPC ............ *F03D 1/0675* (2013.01); *B29C 70/48* (2013.01); *B29C 70/52* (2013.01);
(Continued)

(58) Field of Classification Search
CPC .... F03D 1/0675; F03D 1/0683; F03D 1/0608; F03D 1/0625; F03D 1/0633; B29C 70/48;
(Continued)

(56) References Cited

U.S. PATENT DOCUMENTS 10,105,913 B2  10/2018  Sandercock
2007/0183888 A1  8/2007  Gunneskov et al.
(Continued)

FOREIGN PATENT DOCUMENTS

CN    1533476 A    9/2004
CN    102116253 A    7/2011
(Continued)

OTHER PUBLICATIONS

European Search Report dated Jun. 14, 2018 for Application No. 17210022.4.
(Continued)

*Primary Examiner* — Courtney D Heinle
*Assistant Examiner* — Andrew Thanh Bui
(74) *Attorney, Agent, or Firm* — Schmeiser, Olsen & Watts LLP

(57) ABSTRACT

A pultruded fibrous composite strip, a spar cap made from such strips, a wind turbine rotor blade having such a spar cap and a method for making a spar cap from such strips is provided. The strip is stacked with similar strips to form the spar cap. The strip has a substantially constant cross-section defined by first and second mutually opposed and longitudinally extending sides, and by first and second longitudinal edges. The first and the second sides include first and second abutment surfaces, respectively. The first and the second abutment surfaces are non-planar. When the strip is stacked with similar strips, and subsequently integrated within shell of the wind turbine blade, the non-planar profile of the strips at least partially obviates formation of resin rich pockets at the interface of the spar cap and the shell and/or stress concentration between the edges of the spar cap and the shell.

7 Claims, 8 Drawing Sheets

(51) Int. Cl.
  *B29C 70/48* (2006.01)
  *B29C 70/52* (2006.01)
  *B29L 31/08* (2006.01)

(52) U.S. Cl.
  CPC .... *B29D 99/0028* (2013.01); *B29L 2031/085* (2013.01); *F05B 2230/20* (2013.01); *F05B 2240/301* (2013.01)

(58) Field of Classification Search
  CPC .............. B29C 70/52; B29D 99/0028; B29L 2031/085; F05B 2230/20; F05B 2240/301
  USPC ...................................................... 416/223 R
  See application file for complete search history.

(56) References Cited

U.S. PATENT DOCUMENTS

| | | |
|---|---|---|
| 2008/0181781 A1 | 7/2008 | Livingston et al. |
| 2011/0052408 A1 | 3/2011 | Zuteck |
| 2011/0052409 A1 | 3/2011 | Lupulescu et al. |
| 2011/0135485 A1 | 6/2011 | Wang |
| 2011/0243750 A1 | 10/2011 | Gruhn et al. |
| 2012/0027609 A1* | 2/2012 | Ogde ................ B29C 70/541 416/226 |
| 2012/0087801 A1 | 4/2012 | Driver et al. |
| 2014/0003956 A1* | 1/2014 | Lull ........................ F03D 1/065 416/230 |
| 2014/0234114 A1 | 8/2014 | Schibsbye |
| 2014/0369845 A1* | 12/2014 | Ruijter ................... F03D 80/00 416/224 |
| 2015/0023799 A1 | 1/2015 | Wetzel et al. |
| 2015/0308404 A1 | 10/2015 | Dahl et al. |
| 2016/0160837 A1 | 6/2016 | Geiger et al. |
| 2016/0167267 A1 | 6/2016 | Laight |
| 2016/0263844 A1 | 9/2016 | Smith |
| 2016/0305399 A1 | 10/2016 | Spandley et al. |
| 2016/0319801 A1 | 11/2016 | Smith |
| 2016/0327020 A1 | 11/2016 | Tobin et al. |
| 2016/0327028 A1 | 11/2016 | March Nomen et al. |
| 2016/0341177 A1 | 11/2016 | Bech et al. |
| 2017/0002792 A1* | 1/2017 | Yarbrough ............ F03D 1/0675 |
| 2017/0030330 A1 | 2/2017 | Caruso et al. |

FOREIGN PATENT DOCUMENTS

| | | | |
|---|---|---|---|
| CN | 103670953 | A | 3/2014 |
| CN | 105473847 | A | 4/2016 |
| CN | 105848860 | A | 8/2016 |
| CN | 105899348 | A | 8/2016 |
| CN | 106121929 | A | 11/2016 |
| CN | 106378942 | A | 2/2017 |
| CN | 106401865 | A | 2/2017 |
| CN | 106903917 | A | 6/2017 |
| CN | 107009644 | A | 8/2017 |
| EP | 2922690 | A1 | 9/2015 |
| EP | 3029314 | A1 | 6/2016 |
| ES | 2589185 | A1 | 11/2016 |
| KR | 20130039468 | A | 4/2013 |
| WO | WO2014096002 | A2 | 6/2014 |
| WO | WO 2014096002 | A2 | 6/2014 |
| WO | WO2015003719 | A2 | 1/2015 |
| WO | WO 2015003719 | A2 | 1/2015 |

OTHER PUBLICATIONS

Extended European Search Report for related European Patent Application No. 17210022.4 dated Jun. 14, 2018; 10 pages.

Liu, Wang-Yu et al: "Bending-torsion coupling design of spar cap of compliant wind turbine blade"; Journal of South China University of Technology (Natural Science Edition); vol. 38, No. 12, pp. 1-6, Year: Dec. 2010.

Lai, Zhong-Yi et al: "Wind turbine blade DF82A spar cap infusion technology research"; Tianjin Dongqi Wind Turbine Blade Engineering Co.,Ltd., Tianjin 300480, China; vol. 4, No. 40, pp. 59-61, Year: 2013.

* cited by examiner

PULTRUDED FIBROUS COMPOSITE STRIPS HAVING NON-PLANAR PROFILES CROSS-SECTION FOR WIND TURBINE BLADE SPAR CAPS

CROSS-REFERENCE TO RELATED APPLICATIONS

This application claims priority to European application No. EP 17210022.4 having a filing date of Dec. 22, 2017 the entire contents of which are hereby incorporated by reference.

FIELD OF TECHNOLOGY

The following relates generally to wind turbines, and in particular, to a spar cap of a wind turbine rotor blade. More specifically, the following relates to pultruded unidirectional fibrous composite strips, spar caps having a stack of such pultruded unidirectional fibrous composite strips, and a method for making a spar cap with such pultruded unidirectional fibrous composite strips.

BACKGROUND

Dimensions of wind turbines and wind blades are ever increasing, and consequently are increasing the challenges to overcome during the manufacturing processes of such wind turbine rotor blades. Presently, preferred materials used to manufacture wind turbine rotor blades, hereinafter also referred to as the blades, are glass- and/or carbon-fiber reinforced plastics commonly referred to as "composites", which are generally processed through hand lay-up and resin injection molding processes. Larger sections, longer spans, thicker structural components of the blades make the resin flow very complex to design and optimize, and thus posing an increased risk of manufacturing errors such as transverse wrinkles, poor impregnation of the resin, air pockets, large areas with dry fibers, and so on and so forth. These errors can extend over wide areas, can be very time consuming and very costly to repair and can drastically affect the cost and reliability of the final product i.e. the manufactured blade for the wind turbine. Additionally, hand lay-up of composite structures becomes very time-consuming especially with the increase of thicknesses and number of layers required in manufacturing of the spar caps.

Recent developments in the wind turbine industry have led to the introduction of pultruded unidirectional fibrous composite strips, i.e. pultruded strips of composite material having unidirectional fibers (UD) reinforcement, mostly in the spar cap constructions, which represent the main load carrying components of the rotor blades.

FIG. 3 shows a cross-sectional view of an airfoil section of a conventionally known rotor blade 210, hereinafter also referred to as the conventional blade 210, having pultruded strips 235 stacked in spar caps 230 of the conventional blade 210. One of these structural elements, i.e. the conventionally known pultruded strips 235 is schematically depicted in FIG. 5. The conventionally known pultruded strip 235, hereinafter also referred to as the conventional strip 235 is defined by planar surfaces and generally resembles a longitudinally, i.e. along a longitudinal axis 299 of the conventional strip 235, elongated rectangular parallelepiped such as a bar or slab, and has a rectangular shaped cross-section when sectioned normally to the longitudinal axis 299. Such conventional strips 235 of FIG. 5 are stacked atop each other to form a stack of the conventional strips 235.

The conventional strip 235 is defined by first and second longitudinally extending sides 251, 252 and by first and second longitudinally extending edges 261, 262, thereby resembling shape of a bar or slab. The conventional strip 235 has first and second abutment surfaces 251a, 252a on the first and second side 251, 252. The first and second abutment surfaces 251a, 252a are generally limited by the first and second peripheral surfaces 251p, 252p. The first and second abutment surfaces 251a, 252a are spaced apart along a vertical axis 297 of the conventional strip 235, and the first and second edges 261, 262 are spaced apart along a transverse axis of the strip 235. The axes i.e. the longitudinal axis 299, the vertical axis 297 and the transverse axis 296 are mutually perpendicular. The first and second abutment surfaces 251a, 252a may be covered with peel ply layers 236. The surface 237 of the peel ply layer 236 is flush with the peripheral surfaces 251p, 252p. The peel ply layers 236 are removed prior to stacking the conventional strips 235. The stack is then resin infused to form the conventional spar cap 230.

As shown in FIG. 3, the conventional blade 210 includes a shell 21. The shell 21 is generally made from two half shells i.e. a leeward shell 21a and a windward shell 21b both molded generally from glass-fiber reinforced plastics. This is generally referred to as the 'butterfly blade' since it has two separate half shells 21a, 21b that are later assembled with each other to form the complete shell 21 for example the two half shells 21a, 21b are glued together to form the shell 21. Alternatively, the blade 210 may include a shell 21 that is formed integrally i.e. the shell 21 does not have the two half shells 21a, 21b but instead is formed in one-part as is done in the well-known integral blade construction of Siemens. Parts of the shell 21 have a sandwich panel construction and comprise a core (not shown) of lightweight material e.g. polyurethane foam, PET foam, balsa wood, ply-wood, etc. sandwiched between inner and outer surfaces or facesheets of the shell 21. Within the blade 210 is a blade cavity 15. The blade 210 may include one or more spar caps 230, generally in pairs for example a pair of spar caps 230 namely spar caps 230a and 230b, or two pairs of spar caps 230 i.e. four spar caps (not shown). Each pair of the spar caps 230 i.e. the spar caps 230a, 230b are supported by a shear web 34, also referred to as the web 34, which forms a generally known I-beam shape along with the spar caps 230a, 230b. The spar caps 230a, 230b, are generally embedded in the shell 21 either partially or completely. One spar cap 230 of each pair is embedded or integrated with the leeward shell 21a and the other spar cap 230 of the pair is embedded or integrated with the windward shell 21b.

The spar caps 230 have a generally elongated rectangular parallelepiped shape such as a bar or slab, elongated in a span wise direction of the blade 210, i.e. in other words the spar cap 230 has a rectangular cross section when sectioned perpendicular to the span of the blade 210. The conventionally known spar cap 230 is made up of the stack(s) of pre-fabricated conventional strips 235 of FIG. 5. The conventional strips 235 are pultruded strips of carbon-fiber reinforced plastic and are substantially flat and have a rectangular cross-section.

During manufacturing of the turbine blade 210 a resin-infusion process is used. Various laminate layers of the shell 21 are laid up, generally by hand-lay, in a mold cavity, the conventional strips 235 are then stacked where the spar caps 230 are to be formed i.e. interspersed between parts of the leeward and the windward shells 21a, 21b, and a vacuum is applied to the mold cavity. Resin is, simultaneously from a far side or subsequently, introduced into the mold. The vacuum pressure causes the resin to flow over and around the laminate layers and the strips 235 of the stack and to infuse into the interstitial spaces between the laid-up layers and between the strips 235. Finally, the resin-infused layup is cured to harden the resin and bond the various laminate layers and the strips 235 together and to each other to form the blade 210.

As has been depicted in FIG. 3 and in FIG. 4 that schematically depicts a detailed view of a region R of FIG. 3, there exists a difference between the shapes, i.e. sectional geometries, of the strips 235 and the shell 21. The strips 235 are flat, i.e. having planar surfaces 251, 252, whereas the shell 21 is curved, particularly the strips 235 that form the outermost and the innermost layers of the spar cap 230 have different sectional geometry i.e. are planar or flat whereas the shell 21 in proximity of these strips 235 forming the spar cap 230 is curved. This difference can lead to resin rich areas at the interface between the two geometries as shown in region R2 of FIG. 4 and/or to "puncturing" of the shell 21 from the corners of the pultruded conventional strips 235, as schematically shown in regions R1 and R3 of FIG. 4. The first defect, i.e. formation of resin rich areas as shown in region R2 can lead to crack initiation at the interface between spar cap 230 and the blade shell 21 which then can develop in longitudinal cracks and/or delamination of the rotor blade structure. The second defect, i.e. puncturing of the blade shell 21 by the corners of the conventional strips 235 can result in longitudinal wrinkles in the blade shell fibers, in an obstruction of the resin flow and/or blade shell fibers cut when pressure is applied from vacuum bags during or prior to resin infusion.

Thus, in a nutshell the stacking of the conventional strips 235 during manufacturing of the spar caps 230 results into problematic areas such as the regions R1, R3 and/or the region R2 as shown in FIG. 4. Therefore, there exists a need for a technique that ensures that formation of resin rich areas R2 and/or puncturing of the shell 21 in regions R1, R2 is at least partially obviated.

SUMMARY

An aspect relates to a technique that ensures that formation of resin rich areas R2 and/or puncturing of the shell 21 in regions R1, R2 is at least partially obviated.

In a first aspect of the present technique a pultruded fibrous composite strip is presented. The pultruded fibrous composite strip, hereinafter also referred to as the strip is for stacking with one or more similar strips to form a spar cap of a wind turbine rotor blade, hereinafter also referred to as the blade. The strip has a substantially constant cross-section defined by first and second mutually opposed and longitudinally extending sides, and by first and second longitudinal edges. The first side includes a first abutment surface and the second side includes a second abutment surface. The first abutment surface and the second abutment surface, hereinafter together referred to as the abutment surfaces, have a non-planar profile. When the strip is stacked with similar strips, in preparation of resin infusion and subsequent curing of the resin to bond the strip with the other similar strips to form the spar cap, the non-planar profile or shape of the abutment surfaces of the strips avoid formation of resin rich pockets or regions at the interface of the shell of the wind turbine rotor blade and the strips, as compared to when conventionally known strips with flat or planar abutment surfaces are embedded into the shell. Furthermore, the non-planar profiles of the abutment surfaces also ensure that sectional geometries of the strips substantially matches the sectional geometry of the region of the shell where the strips are embedded and thus puncturing of the shell by the corners of the strips is at least partially obviated as compared to conventionally known strips with flat or planar abutment surfaces.

The profile of the abutment surface means an outline, silhouette, contour, shape of the surface. The profile of the abutment surface is represented by a curvature of the surface when observed holistically for the surface.

The pultruded fibrous composite strip is a pultruded strip of composite material having unidirectional fibers (UD) reinforcement. The pultruded strips have structural fibers, generally longitudinally running along the strip and hence unidirectional, made of glass, carbon, aramid and/or basalt, while the matrix that keeps the fibers together in the strip and protects them from external agents may be, but not limited to, epoxy, vinylester, polyurethane, polyester, etc.

In different embodiments of the strip, the abutment surfaces have a curved profile, a V-shaped profile, and an open polygon shaped profile, respectively. With these shapes or profiles the strips can be stacked such that the strips are geometrically aligned with or in agreement to the shape of the shell in the region where the strips are integrated i.e. where the spar caps are formed.

In another embodiment of the strip, the first side further includes two peripheral surface regions—each extending longitudinally. The first abutment surface is limited between the peripheral surface regions of the first side and separated from the first and second longitudinal edges by the peripheral surface regions of the first side. Similarly, the second side further includes two peripheral surface regions—each extending longitudinally. The second abutment surface is limited between the peripheral surface regions of the second side and separated from the first and second longitudinal edges by the peripheral surface regions of the second side. In this embodiment, at least one of the peripheral surface regions is chamfered, i.e. includes a chamfer recess. In another embodiment of the strip, both the peripheral surface regions of at least one of the first and the second sides are chamfered. Due to chamfering the resin flow to the abutment surfaces is facilitated.

In another embodiment of the strip, the strip includes a first peel-ply layer on the first abutment surface and/or a second peel-ply layer on the second abutment surface. The peel-ply layer at least partially covers the abutment surface on which the peel-ply layer is present. The peel-ply layer is present on the abutment surface(s) having the non-planar profile. The peel-ply or the peel-plies may be removed before stacking of the strips and before performing resin infusion and the removal of the peel-ply or the peel-plies provides a roughened surface on the abutment surface from where the peel-ply has been removed.

In a second aspect of the present technique, a spar cap for a wind turbine rotor blade is presented. The spar cap includes a plurality of pultruded fibrous composite strips stacked with one or more similar strips to form a stack of the strips. Each of the strips is as described hereinabove for the first aspect of the present technique. In the stack, the strips are oriented such that one of the abutment surfaces of the strip are aligned to or in agreement with the shape of the shell in the region where the strips are embedded, i.e. in other words the strips are oriented such that the contour of the strip generally or substantially follows the contour of the shell in the region where the strips are embedded.

In a third aspect of the present technique, a wind turbine rotor blade is presented. The wind turbine rotor blade, hereinafter also referred to as the blade, has at least one spar cap extending longitudinally in a span-wise direction of the blade. The spar cap includes a plurality of pultruded fibrous composite strips stacked with one or more similar strips. Each of the strips is according to the first aspect of the present technique as described hereinabove. Each of the strips is oriented such that the first and the second sides of the strip longitudinally extend along the span-wise direction of the blade and are spaced apart in a flap-wise direction of the blade, and the first and the second edges of the strip longitudinally extend along the span-wise direction of the blade and are spaced apart in a chordwise direction of the blade.

In a fourth aspect of the present technique a method for making a spar cap for a wind turbine rotor blade is presented. In the method of the present technique, a plurality of pultruded fibrous composite strips is provided. Each of the strips is according to the first aspect of the present technique described hereinabove. The strips are then stacked in a mold to form a stack of the strips. The strips are stacked such that contour of the strips generally or substantially follows the contour of the shell in the region where the strips are embedded or stacked. Thereafter, in the method, resin is supplied to the stack. Finally, in the method, the resin is cured to bond the adjacent strips together and to bond the shell with the strips.

In an embodiment of the method, one or more of the strips include a first peel-ply layer at least partially covering the first abutment surface and/or a second peel-ply layer at least partially covering the second abutment surface. The peel-ply layer is present on the surface having the non-planar profile. In the method the first and/or the second peel plies are removed from their respective abutment surfaces before stacking the strips in the mold to form the stack of the strips.

BRIEF DESCRIPTION

Some of the embodiments will be described in detail, with references to the following Figures, wherein like designations denote like members, wherein:

FIG. 1 schematically depicts a wind turbine having a wind turbine rotor blade in which a spar cap made from pultruded fibrous composite strips of the present technique is incorporated, in accordance with embodiments of the present invention;

FIG. 2 schematically depicts the wind turbine rotor blade in which the spar cap made from the pultruded fibrous composite strips of the present technique incorporated, in accordance with embodiments of the present invention;

Figure 2:
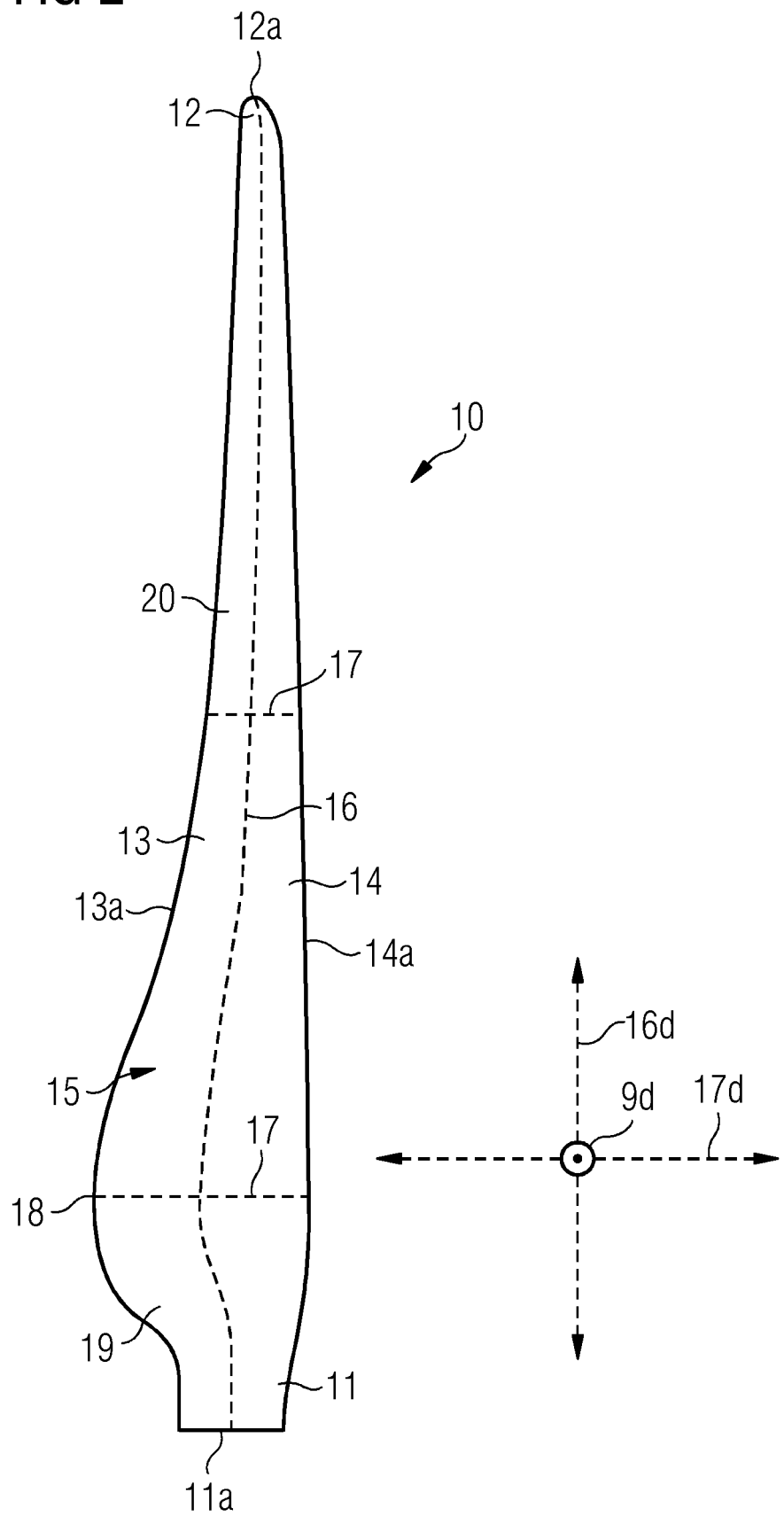
Figure 6:
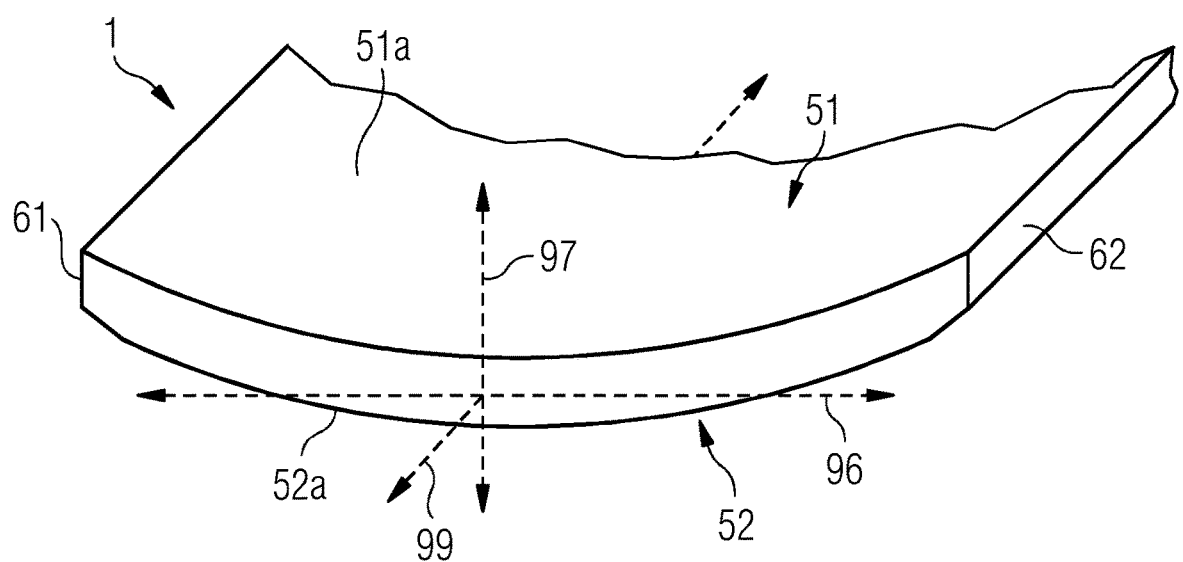
Figure 7:
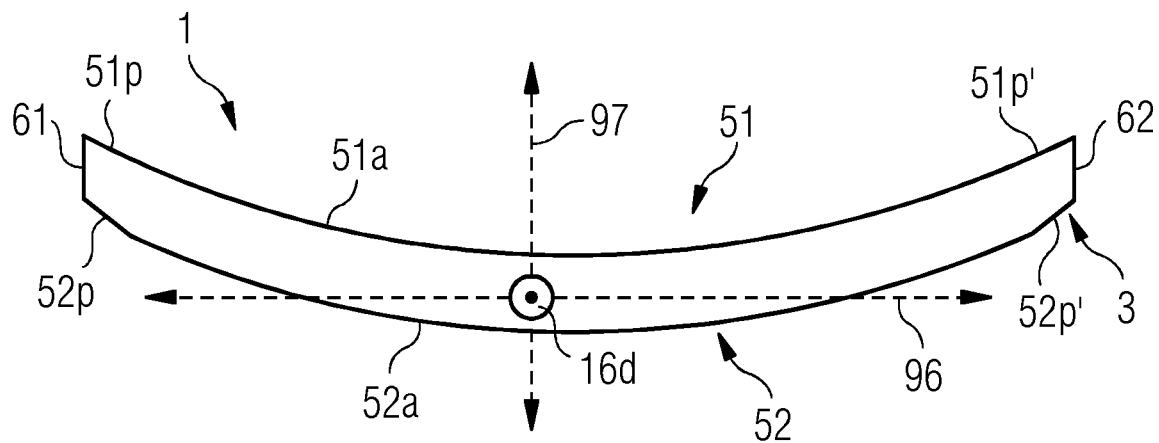
Figure 8:
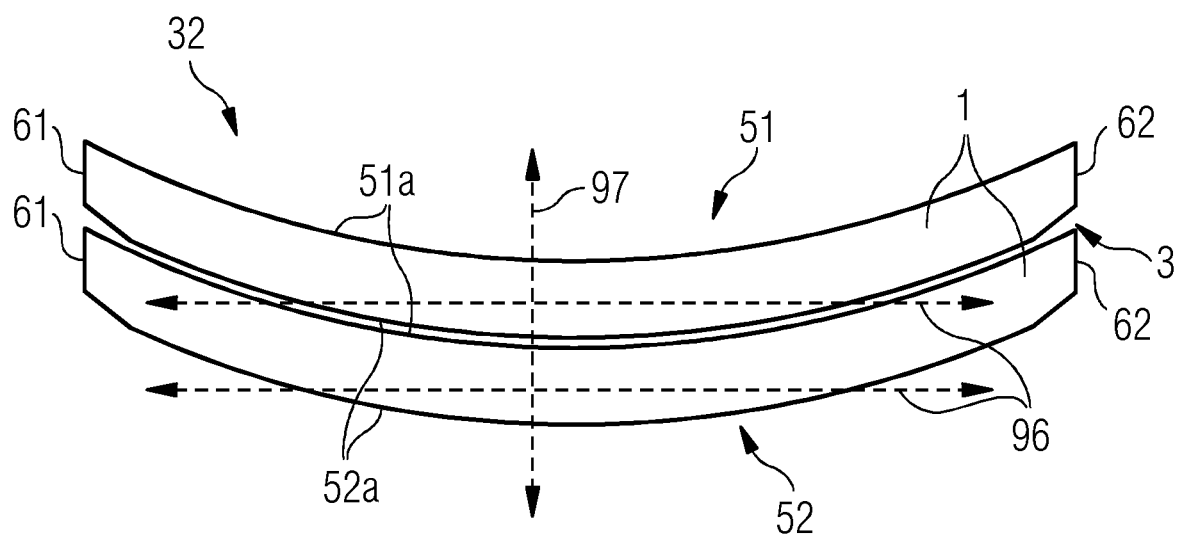
Figure 9:
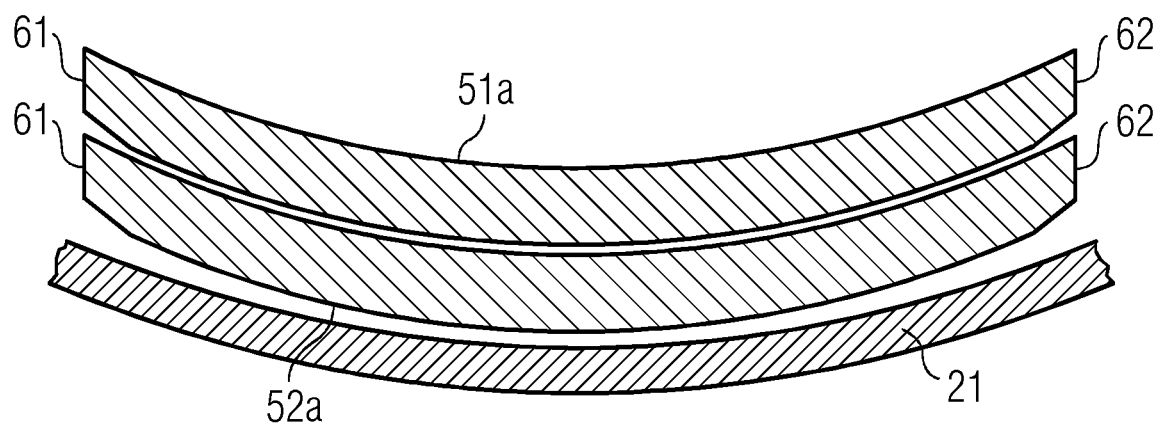
Figure 10:
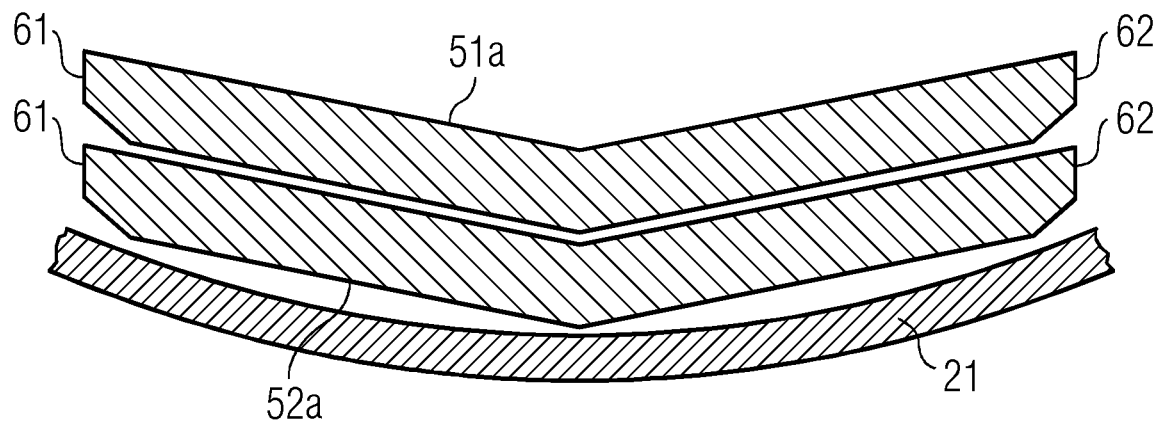
Figure 11:
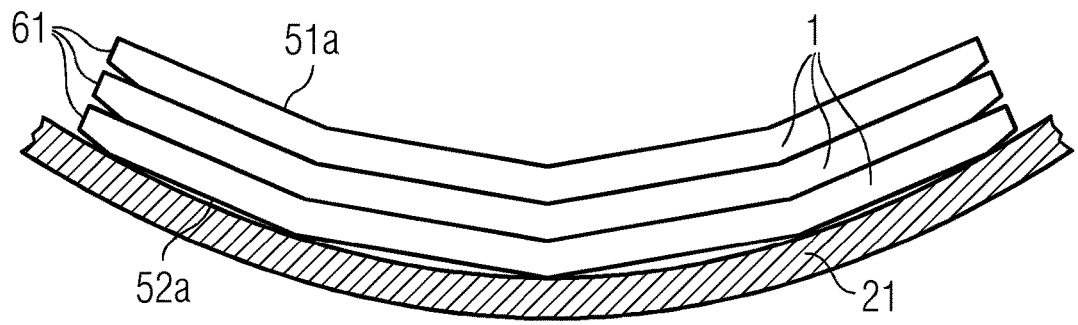
Figure 12:
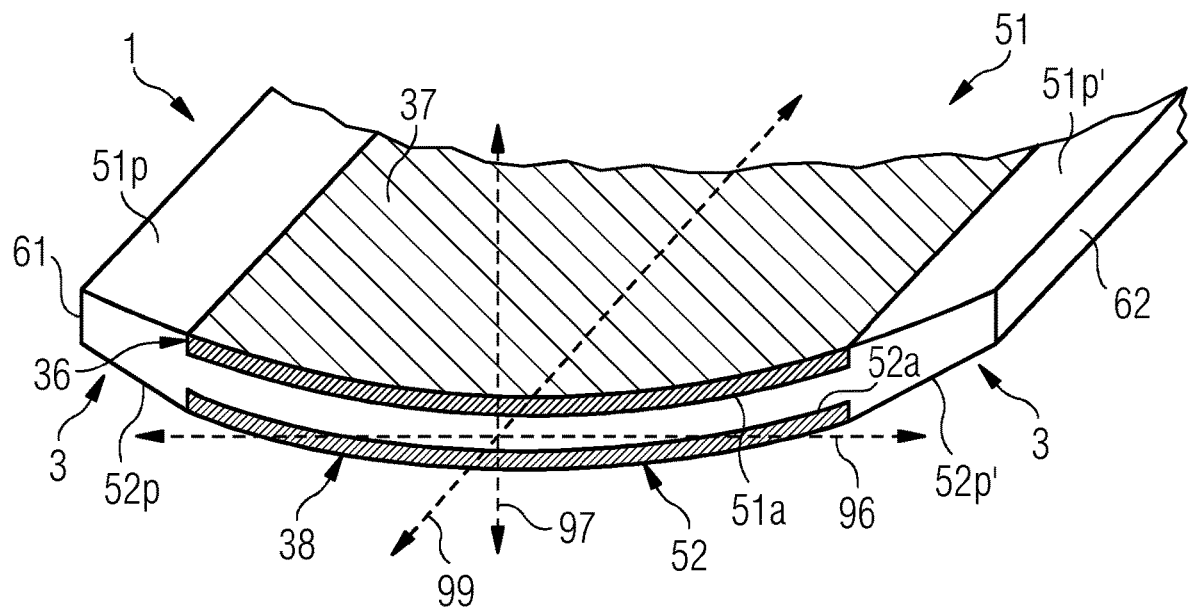
Figure 13:
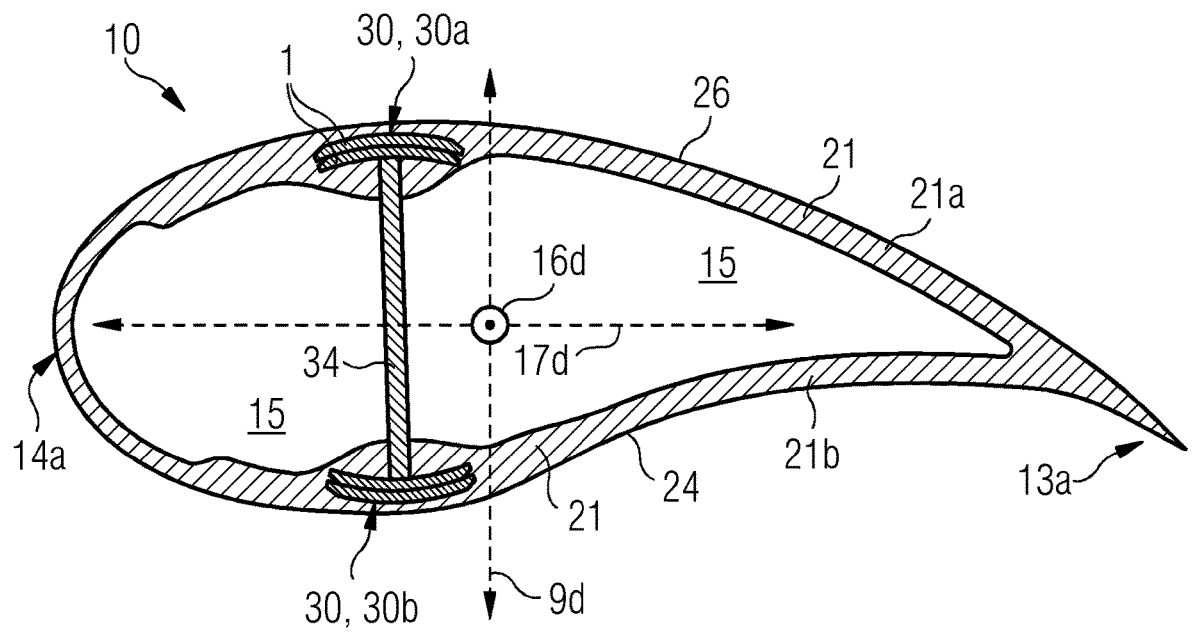
Figure 14:
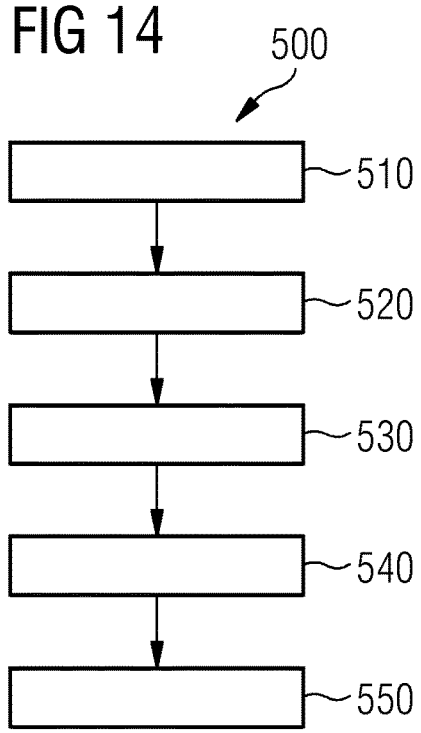

FIG. 6 schematically depicts a perspective view of an exemplary embodiment of a pultruded fibrous composite strip of the present technique, in accordance with embodiments of the present invention;

FIG. 7 schematically depicts a cross-sectional view of the pultruded strip of FIG. 6 depicting the non-planar profiles of abutment surfaces of the strip, in accordance with embodiments of the present invention;

FIG. 8 schematically depicts a cross-sectional view of an exemplary embodiment of two pultruded fibrous composite strips of FIG. 6 stacked with each other for manufacturing the spar cap of the present technique, in accordance with embodiments of the present invention;

FIG. 9 schematically depicts a cross-sectional view of strips having abutment surfaces with curved profile stacked with each other with respect to a region of a shell of the wind turbine rotor blade where the spar cap is intended to be formed, in accordance with embodiments of the present invention;

FIG. 10 schematically depicts a cross-sectional view of strips having abutment surfaces with V-shaped profile stacked with each other with respect to a region of a shell of the wind turbine rotor blade where the spar cap is intended to be formed, in accordance with embodiments of the present invention;

FIG. 11 schematically depicts a cross-sectional view of strips having abutment surfaces with open polygon shaped profile stacked with each other with respect to a region of a shell of the wind turbine rotor blade where the spar cap is intended to be formed, in accordance with embodiments of the present invention;

FIG. 12 schematically depicts a perspective view of an exemplary embodiment of the pultruded strip of the present technique depicting a first peel-ply layer and a second peel-ply layer on the first and the second abutment surfaces, respectively, in accordance with embodiments of the present invention;

FIG. 13 depicts a cross-sectional view of an exemplary embodiment of an airfoil of the wind turbine rotor blade of FIG. 2 having a spar cap made from the strips of the present technique, in accordance with embodiments of the present invention; and FIG. 14 presents a flow chart depicting a method for making a spar cap for a wind turbine rotor blade, in accordance with embodiments of the present invention.

DETAILED DESCRIPTION

Hereinafter, above-mentioned and other features of the present technique are described in detail. Various embodiments are described with reference to the drawing, wherein like reference numerals are used to refer to like elements throughout. In the following description, for the purpose of explanation, numerous specific details are set forth in order to provide a thorough understanding of one or more embodiments. It may be noted that the illustrated embodiments are intended to explain, and not to limit embodiments of the invention. It may be evident that such embodiments may be practiced without these specific details.

It may be noted that in the present disclosure, the terms "first", "second", "third" etc. are used herein only to facilitate discussion and carry no particular temporal or chronological significance unless otherwise indicated.

Figure 1:
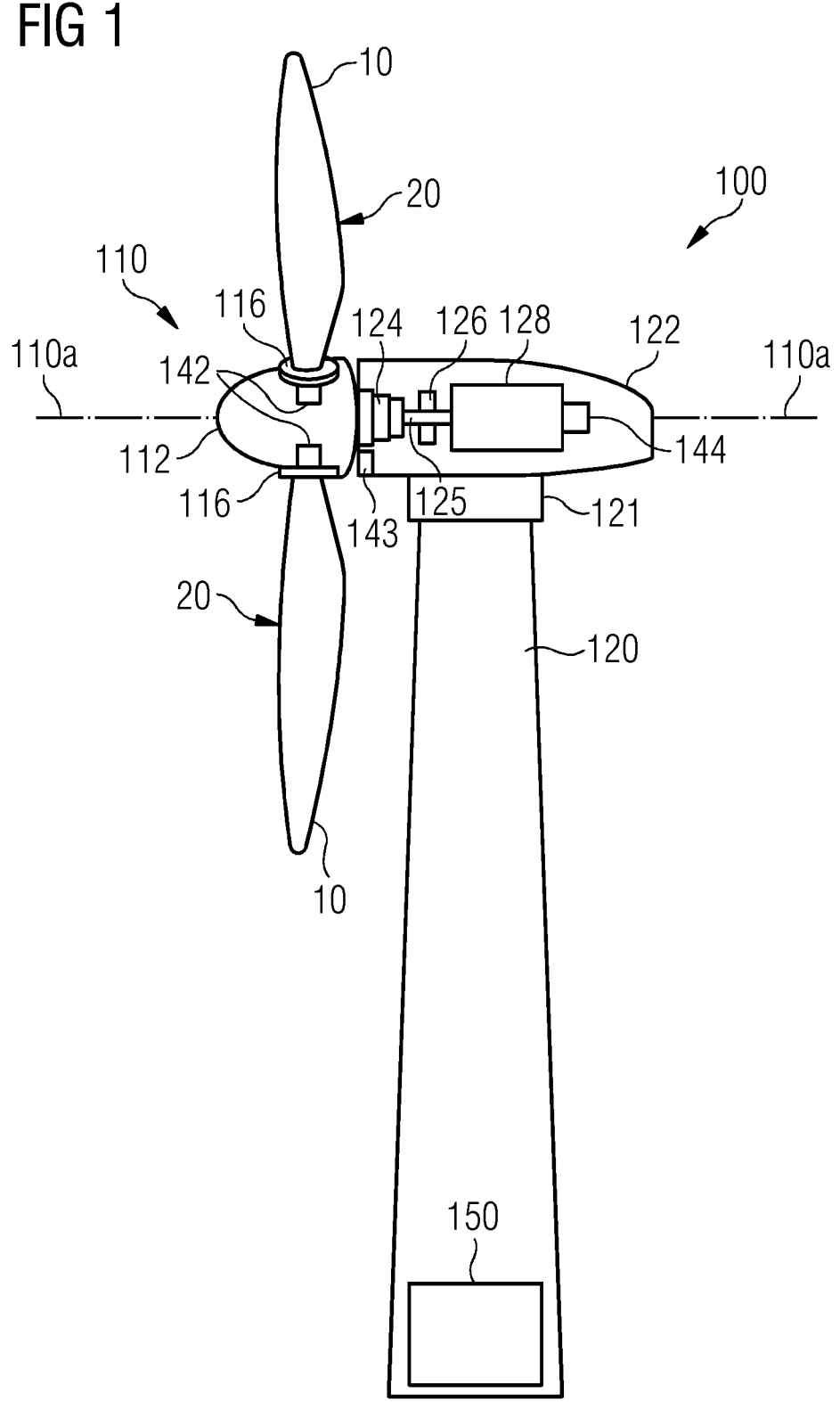

FIG. 1 shows an exemplary embodiment of a wind turbine 100 of the present technique. The wind turbine 100 includes a tower 120, which is mounted on a fundament (not shown). A nacelle 122 is mounted on top of the tower 120 and rotatable with regard to the tower 120 by means of a yaw angle adjustment mechanism 121 such as yaw bearings and yaw motors. The yaw angle adjustment mechanism 121 functions to rotate the nacelle 122 around a vertical axis (not shown) referred to as a yaw axis, which is aligned with the longitudinal extension of the tower 120. The yaw angle adjustment mechanism 121 rotates the nacelle 122 during operation of the wind turbine 100 to ensure that the nacelle 122 is appropriately aligned with the current wind direction to which the wind turbine 100 is subjected.

The wind turbine 100 further includes a rotor 110 having at least a rotor blade 10, and generally three rotor blades 10, although in the perspective view of FIG. 1 only two rotor blades 10 are visible. One of the rotor blades 10 is schematically depicted in FIG. 2. The rotor 110 is rotatable around a rotational axis 110a. The rotor blades 10, hereinafter also referred to as the blades 10 or as the blade 10 when referring to one of the blades 10, are generally mounted at a driving collar 112, also referred to as a hub 112. The hub 112 is mounted rotatable with regard to the nacelle 122 by means of a main bearing (not shown). The hub 112 is rotatable about the rotational axis 110a. Each of the blades 10 extends radially with respect to the rotational axis 110a and has an airfoil section 20.

In between the hub 112 and each of the rotor blades 10, is provided a blade adjustment mechanism 116 in order to adjust the blade pitch angle of the blade 10 by rotating the respective blade 10 about a longitudinal axis (not shown) of the blade 10. The longitudinal axis of each of the blade 10 is aligned substantially parallel with the longitudinal extension of the respective blade 10. The blade adjustment mechanism 116 functions to adjust blade pitch angles of the respective blade 10.

The wind turbine 100 includes a main shaft 125 that rotatably couples the rotor 110, particularly the hub 112, to a generator 128 housed within the nacelle 122. The hub 112 is connected to a rotor of the generator 128. In an exemplary embodiment (not shown) of the wind turbine 100, the hub 112 is connected directly to the rotor of the generator 128, thus the wind turbine 100 is referred to as a gearless, direct drive wind turbine 100. As an alternative, as shown in the exemplary embodiment of FIG. 1, the wind turbine 100 includes a gear box 124 provided within the nacelle 122 and the main shaft 125 connects the hub 112 to the generator 128 via the gear box 124, thereby the wind turbine 100 is referred to as a geared wind turbine 100. The gear box 124 is used to convert the number of revolutions of the rotor 110 into a higher number of revolutions of the main shaft 125, and consequently of the rotor of the generator 128. Furthermore, a brake 126 is provided in order to stop the operation of the wind turbine 100 or to reduce the rotational speed of the rotor 110 for instance in case of a very strong wind and/or in case of an emergency.

The wind turbine 100 further includes a control system 150 for operating the wind turbine 100 at desired operational parameters, for example at a desired yaw angle, with a desired blade pitch, at a desired rotational speed of the rotor 110, and so on and so forth. The controlling and/or adjusting of the operational parameters are performed to obtain an optimized power generation under the existent conditions for example under existent wind conditions and other weather conditions.

The wind turbine 100 may further include different sensors for example a rotational speed sensor 143, a power sensor 144, angle sensors 142, etc. that provide inputs to the control mechanism 150 or other components of the wind turbine 100 to optimize operation of the wind turbine 100.

Furthermore, as shown in FIG. 2, the rotor blade 10 includes a root section 11 having a root 11a and an airfoil section 20. Generally, the rotor blade 10 includes a transition section 90 in between the root section 11 and the airfoil section 20. The airfoil section 20, hereinafter also referred to as the airfoil 20, includes a tip section 12 having a tip 12a. The root 11a and the tip 12a are separated by a span 16, of the rotor blade 10, which follows the shape of the rotor blade 10. A direction along or parallel to the span 16 is referred to as span-wise direction 16d. The tip section 12, including the tip 12a therein, extends from the tip 121 towards the root 11a up to a span-wise position of approximately 33.3% (percent), i.e. one third of the total length of the blade 10, as measured from the tip 12a. The tip 12a extends within the tip section 12 towards the root 11a up to a span-wise position of approx. one meter. The rotor blade 10 includes a leading edge section 14 having a leading edge 14a, and a trailing edge section 13 having a trailing edge 13a. The trailing edge section 13 surrounds the trailing edge 13a. Similarly, the leading edge section 14 surrounds the leading edge 14a.

At each span-wise position perpendicular to the span 16, a chord line 17 that connects the leading edge 14a and the trailing edge 13a can be defined. A direction along or parallel to the chord line 17 is referred to as chord-wise direction 17d. FIG. 2 depicts two such chord lines 17 at two different span-wise positions. Furthermore, a direction mutually perpendicular to the span-wise direction 16d and to the chord-wise direction 17d is referred to as a flap-wise direction 9d. The rotor blade 10 has a shoulder 18 that is a section of the rotor blade 10 where the chord line 17 has maximum chord length, i.e. in example of FIG. 2 at the chord line 17 that is depicted towards the root 11a.

Figure 3:
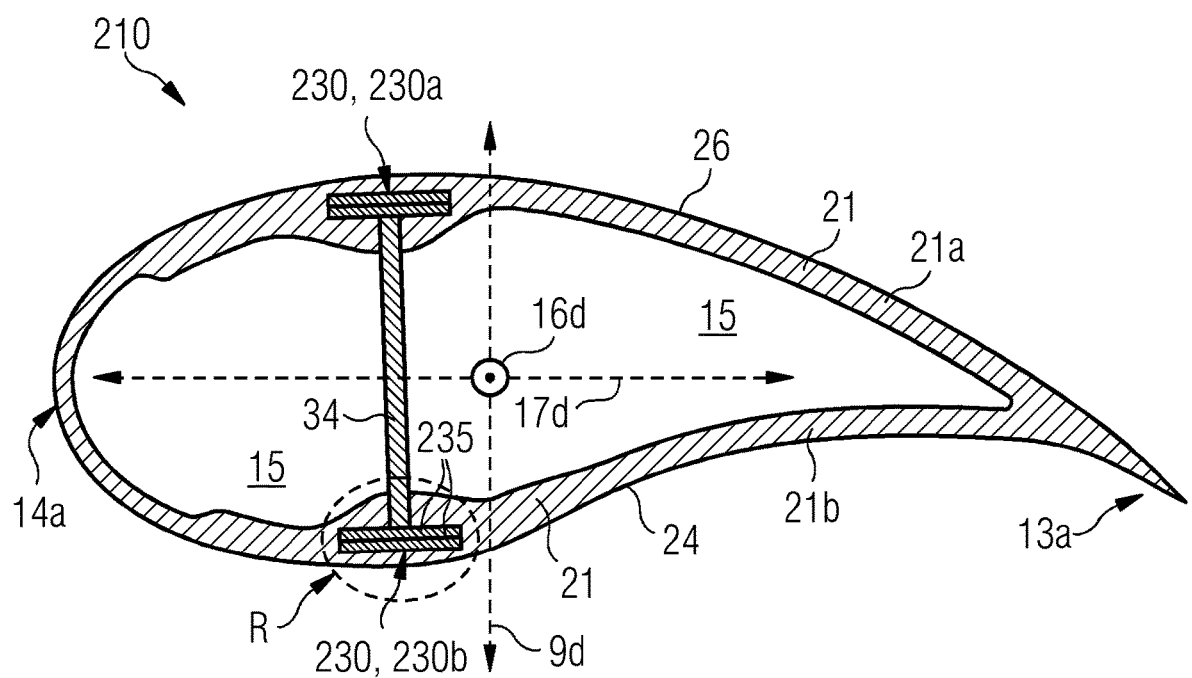
FIG. 3 depicts a cross-sectional view of an airfoil of a conventionally known turbine blade having a conventionally known spar cap made from conventionally known pultruded strips.

In the wind turbine 100, one or more of the blades 10 include one or more spar caps 30 shown in FIG. 13 according to the present technique. In accordance with the present technique, the spar cap 30 of the present technique includes a component of such a spar cap 30 i.e. a pultruded strip 1 as shown in FIGS. 6 to 12. The technique also presents a method 500 for making such a spar cap 30 using the pultruded strip 1 of the present technique as shown in FIG. 14. Hereinafter, FIGS. 6 to 14 in combination with FIGS. 1 and 2 have been referred to further explain the present technique. It may be noted that the rotor blade 10 of the present technique differs from the conventionally known rotor blade 210 as shown in FIG. 3 only for the spar cap 30 and the pultruded strips 1, and other components of the rotor blade 10 are same as described hereinabove with reference to FIG. 3 for the conventional blade 210, for example the web 34, the leeward and windward shells 21a, 21b, etc. The difference between the present technique as compared to the conventionally known techniques is in the geometrical structure of the pultruded strip 1 as opposed to the structure of the conventional strip 235, and in the spar cap 30 resulting from the use of the pultruded strips 1 as opposed to the spar caps 230 formed from the conventional strips 235.

FIGS. 6 and 7 show exemplary embodiments of the pultruded strip 1 of the present technique. As aforementioned, the pultruded strips 1, hereinafter also referred to as the strip 1 are pultruded unidirectional fibrous composite strips. The strip(s) 1, depicted in FIGS. 6 to 13 is a pultruded strip of composite material having unidirectional fibers (UD) reinforcement i.e. the strips 1 have structural fibers, generally longitudinally running along the strip 1, and hence unidirectional, made of glass, carbon, aramid and/or basalt, while the matrix that keeps the fibers together in the strip 1 and protects the fibers from external agents may be, but not limited to, epoxy, vinylester, polyurethane, polyester, etc. Each of the strips 1 are formed by pultrusion, a continuous process similar to extrusion, in which fibers e.g. glass-fibers or carbon-fibers are pulled through a supply of liquid resin i.e. through the material of the matrix that keeps the fibers together, and through dies that shape the strip 1 to the shape according to the present technique. The resin i.e. the matrix material is then cured, for example by heating in an open chamber, or by employing heated dies that cure the resin as the strip 1 is pultruded.

The strip 1 is used to form the spar cap 30 of FIG. 13 by stacking the strip 1 with one or more similar strips 1 to form the spar cap 30 of the rotor blade 10 of the wind turbine 100. As shown in FIGS. 6 and 7, the strip 1 has a longitudinal axis 99 extending generally in the direction in which the strip 1 was pultruded when manufactured, and which is also the direction along which the fibers (not shown) of the strip 1 extend. The strip 1 has a first side 51 and a second side 52 opposite to the first side 51, and a first edge 61 and a second edge 62 opposite to the first edge 61. The strip 1 has a substantially constant cross-section, i.e. the strip 1 maintains its cross-sectional shape and dimensions at positions along the longitudinal axis 99. The strip 1 is defined by the first and the second mutually opposed and longitudinally extending sides 51, 52 and by the first and the second longitudinal edges 61, 62 i.e. the sides 51, 52 and the edges 61, 62 extend generally parallelly to the longitudinal axis 99 of the strip 1.

The first side 51 includes a first abutment surface 51a. The first abutment surface 51a may be the entire surface of the first side 51 i.e. covering the entire expanse between the first and the second edges 61, 62. Alternatively, the first abutment surface 51a may be a substantial part of the entire surface of the first side 51 and may be limited by borders or peripheral regions 51p, 51p' or peripheral surface regions 51p, 51p' of the first side 51 towards the first and the second edges 61, 62, or in other words, the surface of the first side 51 has three regions—namely the two peripheral surface regions 51p, 51p' and the first abutment surface 51a sandwiched between the two peripheral surface regions 51p, 51p'. The peripheral surfaces 52p, 52p' separate the second abutment surface 52a from the first and the second edges 61, 62. The width of each of the peripheral surface regions 51p, 51p' i.e. expanse of each of the peripheral surface region 51p, 51p' as measured along the first side 51 and perpendicular to the longitudinal axis 99 may be between 2% and 10% of a distance between the first and the second edge 61, 62 as measured along the first side 51 and perpendicular to the longitudinal axis 99. The advantage of having the peripheral regions 51p, 51p' is that presence of the peripheral regions 51p, 51p' allows incorporation of a peel ply (not shown in FIGS. 6 and 7) on the surface of first side 51 during the pultrusion process. When a peel ply is incorporated on the surface of first side 51 during the pultrusion process, the area or region of the surface of the first side 51 covered by the peel-ply is the first abutment surface 51a, and the areas or regions of the surface of the first side 51 not covered by the peel-ply are the peripheral surface regions 51p, 51p'. When a peel ply is incorporated on the surface of first side 51, a surface of the peel ply is flush with the peripheral surface regions 51p, 51p'.

Similarly, the second side 52 includes a second abutment surface 52a. The second abutment surface 52a may be the entire surface of the second side 52 i.e. covering the entire expanse between the first and the second edges 61, 62. Alternatively, the second abutment surface 52a may be a substantial part of the entire surface of the second side 52 and may be limited by borders or peripheral regions 52p, 52p' or peripheral surface regions 52p, 52p' of the second side 52 towards the first and the second edges 61, 62, or in other words, the surface of the second side 52 has three regions—namely the two peripheral surface regions 52p, 52p' and the second abutment surface 52a sandwiched between the two peripheral surface regions 52p, 52p'. The peripheral surfaces 52p, 52p' separate the second abutment surface 52a from the first and the second edges 61, 62. The width of each of the peripheral surface regions 52p, 52p' i.e. expanse of each of the peripheral surface region 52p, 52p' as measured along the second side 52 and perpendicular to the longitudinal axis 99 may be between 2% and 10% of a distance between the first and the second edge 61, 62 as measured along the second side 52 and perpendicular to the longitudinal axis 99. The advantage of having the peripheral regions 52p, 52p' is that presence of the peripheral regions 52p, 52p' allows incorporation of a peel ply (not shown in FIGS. 6 and 7) on the surface of second side 52 during the pultrusion process. When a peel ply is incorporated on the surface of second side 52 during the pultrusion process, the area or region of the surface of the second side 52 covered by the peel-ply is the second abutment surface 52a, and the areas or regions of the surface of the second side 52 not covered by the peel-ply are the peripheral surface regions 52p, 52p'. When a peel ply is incorporated on the surface of second side 52, a surface of the peel ply is flush with the peripheral surface regions 52p, 52p'.

According to aspects of the present technique, the first abutment surface 51a and the second abutment surface 52a have non-planar profile. The profiles of the first abutment surface 51a and the second abutment surface 52a, hereinafter together referred to as the abutment surfaces 51a, 52a, are geometrically similar i.e. if the first abutment surface 51a is curved then the second abutment surface 52a is similarly curved, or if the first abutment surface 51a is v-shaped then the second abutment surface 52a is similarly v-shaped, and so on and so forth. Non-planar as used herein means not forming a flat plane or planar surface.

Figure 5:
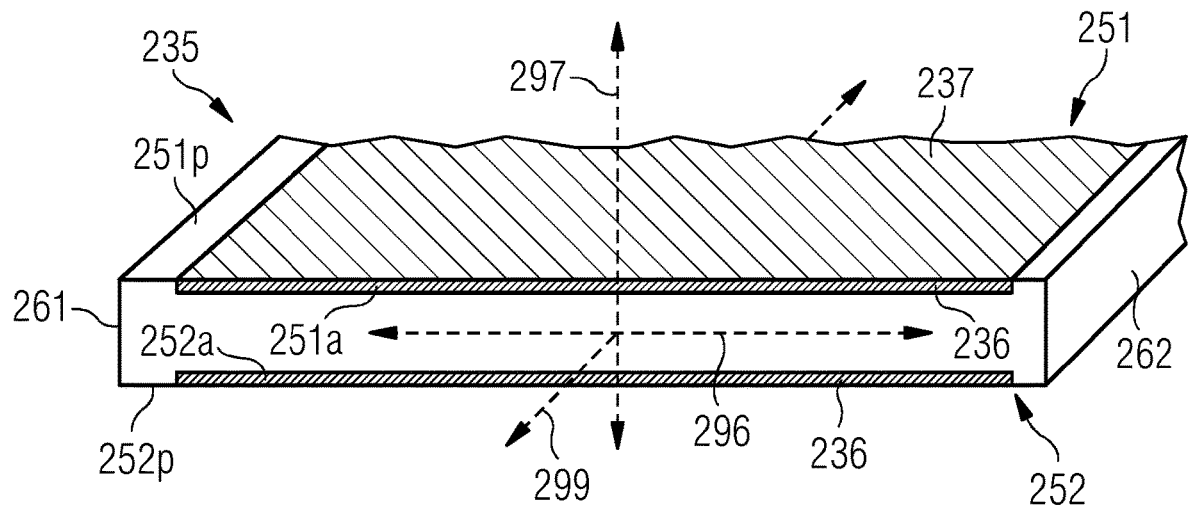
FIG. 5 depicts a conventionally known pultruded strip used to manufacture the conventionally known spar cap.

FIGS. 6 and 7 show a three-axis coordinate system, formed by the mutually perpendicular longitudinal axis 99, a transverse axis 96 and a vertical axis 97, to further explain the non-planar profile the abutment surfaces 51a, 52a. The first and the second edges 61, 62 are spaced apart along the transverse axis 96, whereas the first and the second abutment surfaces 51a, 52a are spaced apart along the vertical axis 97, which also defines the thickness of the strip 1. As can be seen in FIGS. 6 and 7, the abutment surfaces 51a, 52a are not parallel to the transverse axis 96, and thus do not form a flat planes. Furthermore, the abutment surfaces 51a, 52a are not parallel to a plane formed by the transverse axis 96 and the longitudinal axis 99 i.e. in other words each of the abutment surfaces 51a, 52a are mutually non-parallel to the transverse axis 96 and the longitudinal axis 99. The difference between the geometrical shape of the conventional strip 235 and the strip 1 of the present technique is further explained by comparison of FIG. 5 showing the conventional strip 235 to FIG. 6 depicting the strip 1 of the present technique. As can be seen from FIG. 5, the abutment surfaces 251a, 252a of the conventional strip 235 are parallel to the transverse axis 296 of the conventional strip 235, or in other words mutually parallel to the transverse axis 296 and the longitudinal axis 299 of the conventional strip 235.

The non-planar profile of the abutment surfaces 51a, 52a of the strip 1 can be realized by abutment surfaces 51a, 52a which are curved as depicted in FIGS. 6 to 9, or can be V-shaped as depicted in FIG. 10, or can be open polygonal shaped as depicted in FIG. 11. When open polygonal shaped, the strips 1 are prismatic in shape.

Besides having the abutment surfaces having non-planar profiles, the strips 1 may also include a chamfer recess 3 as depicted in FIGS. 7 and 8. The chamfer recess 3 extends longitudinally i.e. along the longitudinal axis 99. The chamfer recesses 3 may present in the peripheral surface regions 51p, 51p' of either one or both of the first and the second sides 51, 52. One or both of the peripheral surface regions 51p, 51p' of any side i.e. the first and/or the second side 51, 52, may be chamfered. The chamfer recesses 3 are transitional edges between the abutment surfaces 51a, 52a and the first and the second edges 61,62, and thus the first and the second edges 61, 62 are not aligned perpendicularly to the peripheral surface regions 51p, 51p' when the chamfer recess 3 is incorporated in the peripheral surface regions 51p, 51p'.

FIG. 12 depicts yet another embodiment of the strip 1. In this embodiment the strip 1 includes a first peel-ply layer 36 on the first abutment surface 51a and/or a second peel-ply layer 38 on the second abutment surface 52a. The peel-ply layer 36,38 at least partially covers the abutment surface 51a, 52a on which the peel-ply layer 36,38 is present. The surface 37 of the peel ply layer 36,38 is flush with the surface of the peripheral region 51p, 51p', 52p, 52p' of the sides 51, 52 of the strip 1. In a preferred embodiment as depicted in FIG. 12, the peel-ply layer 36 extends to the chamfer recess 3. Thus, with the peel-ply layer 36,38 removed and resin injection during manufacturing of the blade 10, the resin flow is facilitated from the chamfer recess 3 into the abutment surfaces 51a,52a.

Figure 4:
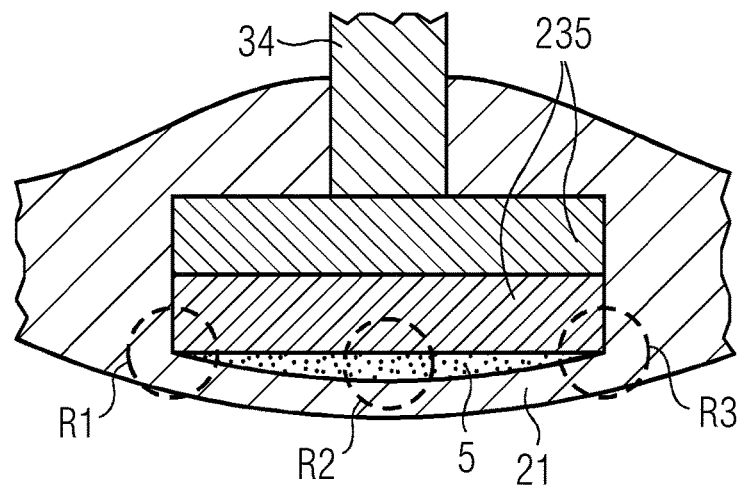
FIG. 4 depicts a detailed view of a region R of the FIG. 3.

FIGS. 8 to 11 show stacks 32 formed by placing the strip 1 on top of another strip 1. It may be noted that directional terminology, such as 'top', 'bottom', 'front', 'back' etc., is used in FIGS. 13 to 16 and in other accompanying FIGS of the present technique with reference to the orientation of the FIG(S) being described. The components of embodiments of the invention can be positioned in a number of different orientations. As such, the directional terminology is used for purposes of illustration and is in no way limiting. For example, the stacking of the strips 1 may be side by side instead of on top of one another. It may also be noted that although in the stacks of FIGS. 8 to 10 only two strips 1 are depicted and in FIG. 11 only three strips 1 are depicted, in general the number of strips 1 in the stacks may be greater, for example between four and twelve, or more. The number of strips 1 to be stacked depends on numerous factors for example, thickness of the strips 1, desired thickness of the spar cap 30, etc. The stack 32 of FIG. 8 shows two identical strips 1 of FIG. 7 stacked. As can be seen the abutment surfaces 51a, 52a of both the strips 1 are non-planar. FIGS. 9, 10 and 11 show the stacked strips 1 with respect to a region of the shell 21 of the wind turbine rotor blade 10 in which the strips 1 are embedded to form the spar cap 30. As can be seen in FIGS. 9 to 11, the strips 1 are stacked in such a way that shape or contour of the strips 1 is generally in agreement with or aligned with shape or contour of the region of the shell 21 of the wind turbine rotor blade 10 in which the strips 1 are embedded to form the spar cap 30. As can be seen by comparison of FIG. 4 with FIGS. 9, 10 and 11, due to the non-planar profile of the strips 1, formation of regions similar to the regions R1, R2, and R3 are at least partially obviated in the present technique.

FIG. 14 depicts a flow chart showing the method 500 for making the spar cap 30, i.e. the one or more of the spar caps 30a, 30b, for the wind turbine rotor blade 10. In the method 500, in a step 510 a plurality of the strips 1 is provided. Each of the strips 1 is as described hereinabove in reference to FIGS. 5 to 11. The strips 1 are then stacked in a mold to form a stack of the strips. In the method 500, after the step 510 in a step 530, the strips 1 are stacked as described hereinabove in reference to FIGS. 8 to 11. After completion of this stage of the method 500, the mold has the stack 32 of the strips 1 and has components that are placed to form parts of the shell 21 of the blade 10. Thereafter, subsequent to the step 530 in the method 500, in a step 540 resin is supplied to the stack 32 and to the other components of the shell 21 placed in the mold. The resin flow in the step 530 may be achieved by Vacuum Assisted Resin Transfer Molding (VARTM) process. Finally, in the method 500, in a step 550 the resin is cured to bond the adjacent strips 1 together and to bond the strips 1 with the components of the shell 21. It may be noted that the supplying of the resin is required creation of partial volume in the mold and pumping in of the resin, and so on and so forth, however the steps are conventionally known in the art of wind turbine blade manufacturing though resin injection and thus not explained herein in further details for sake of brevity.

An embodiment of the method 500, when the strips 1 used for the method 500 include the first and/or the second peel-ply layers 36, 38 as described hereinabove in reference to FIG. 12, includes a step 520 in which the first and/or the second peel plies 36, 38 are removed from their respective abutment surfaces 51a, 52a before the step 530 is performed.

It may be noted that the strips 1 of the present technique are used for the wind turbine blades 10 that have the so-called 'structural shell design' as shown in FIG. 13 in which the spar caps 30a, 30b, are integrated or embedded within the structure of the shell 21, i.e. the outer shell 21. Furthermore, the number of spar caps 30a, 30b, depicted in FIG. 13 are for exemplary purposed only, and it may be appreciated by one skilled in the art that the blade 10 of the present technique may have two spar caps 30 i.e. only one pair of the spar caps 30 as shown in FIG. 13, or may have four (not shown) or more than four (not shown) spar caps 30, for example six spar caps 30 forming three distinct pairs of the spar caps 30.

It may further be noted that the present technique is applicable to the well-known 'integral blade' construction of Siemens, where unlike butterfly blade construction the leeward and windward shells are not separately manufactured. In the integral blade construction the entire shell is manufactured in one-part as an integral shell and thus does not have a separately manufactured leeward and windward side.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A pultruded fibrous composite strip for stacking with one or more similar strips to form a spar cap of a wind turbine rotor blade, the strip being of substantially constant cross-section defined by first and second mutually opposed and longitudinally extending sides and by first and second longitudinal edges, the first and second sides comprising, respectively, first and second abutment surfaces, wherein the first and the second abutment surfaces are non-planar and curve toward a center of the wind turbine rotor blade or are angled toward the center of the wind turbine rotor blade;

wherein the first side is proximate the center of the wind turbine rotor blade and further comprises two peripheral surface regions of the first side each extending longitudinally and wherein the first abutment surface is limited between the two peripheral surface regions of the first side and separated from the first and second longitudinal edges by the two peripheral surface regions of the first side;

wherein the second side is distal to the center for the wind turbine rotor blade and further comprises two peripheral surface regions of the second side each extending longitudinally and wherein the second abutment surface is limited between the two peripheral surface regions of the second side and separated from the first and second longitudinal edges by the two peripheral surface regions of the second side;

wherein the two peripheral surface regions of the second side each have a width measured along the second side and perpendicular to the longitudinal axis, wherein the width is between 2% and 10% of a distance separating the first longitudinal edge and the second longitudinal edge;

wherein the two peripheral surface regions of the second side are chamfered;

wherein the two peripheral surface regions of the first side are not chamfered; and wherein each of the first and second longitudinal edges extend from a respective peripheral surface region of the first side to a respective peripheral surface region of the second side and are not perpendicular to the peripheral surface regions.

2. The strip of claim 1, wherein the first and the second abutment surfaces have an open polygon shaped profile.

3. The strip according to claim 1, wherein the strip comprises a first peel-ply layer and/or a second peel-ply layer, respectively, at least partially covering the first abutment surface and/or the second abutment surface having the non-planar profile, wherein the first peel-ply layer and the second peel-ply layer do not extend to the at least one of the two peripheral surface regions of the first side and the two peripheral surface regions of the second side.

4. A spar cap for a wind turbine rotor blade, wherein the spar cap comprises a plurality of pultruded fibrous composite strips stacked with one or more similar strips and wherein each of the pultruded fibrous composite strips is according to the strip of claim 1.

5. A wind turbine rotor blade having at least one spar cap extending longitudinally in a span-wise direction of the wind turbine rotor blade, the spar cap comprising a plurality of pultruded fibrous composite strips stacked with one or more similar strips, wherein each of the pultruded fibrous composite strips is according to claim 1, and wherein each of the pultruded fibrous composite strips is oriented such that:

the first and the second sides of the strip longitudinally extend along the span-wise direction of the wind turbine rotor blade and are spaced apart in a flap-wise direction of the wind turbine rotor blade, and the first and the second edges of the strip longitudinally extend along the span-wise direction of the wind turbine rotor blade and are spaced apart in a chordwise direction of the wind turbine rotor blade.

6. A method for making a spar cap for a wind turbine rotor blade, the method comprising:

providing a plurality of pultruded fibrous composite strips, wherein each of the pultruded fibrous composite strips is according to claim 1;

stacking the strips in a mold to form a stack of the strips;

supplying resin to the stack; and curing the resin.

7. The method according to claim 6, wherein one or more of the pultruded fibrous composite strips comprises a first peel-ply layer and/or a second peel-ply layer at least partially covering the first abutment surface and/or the second abutment surface, respectively, having non-planar profile, wherein the method further comprises:

removing the first and/or the second peel plies before stacking the strips in the mold to form the stack of the strips.

* * * * *